United States Patent Office 2,938,403
Patented May 31, 1960

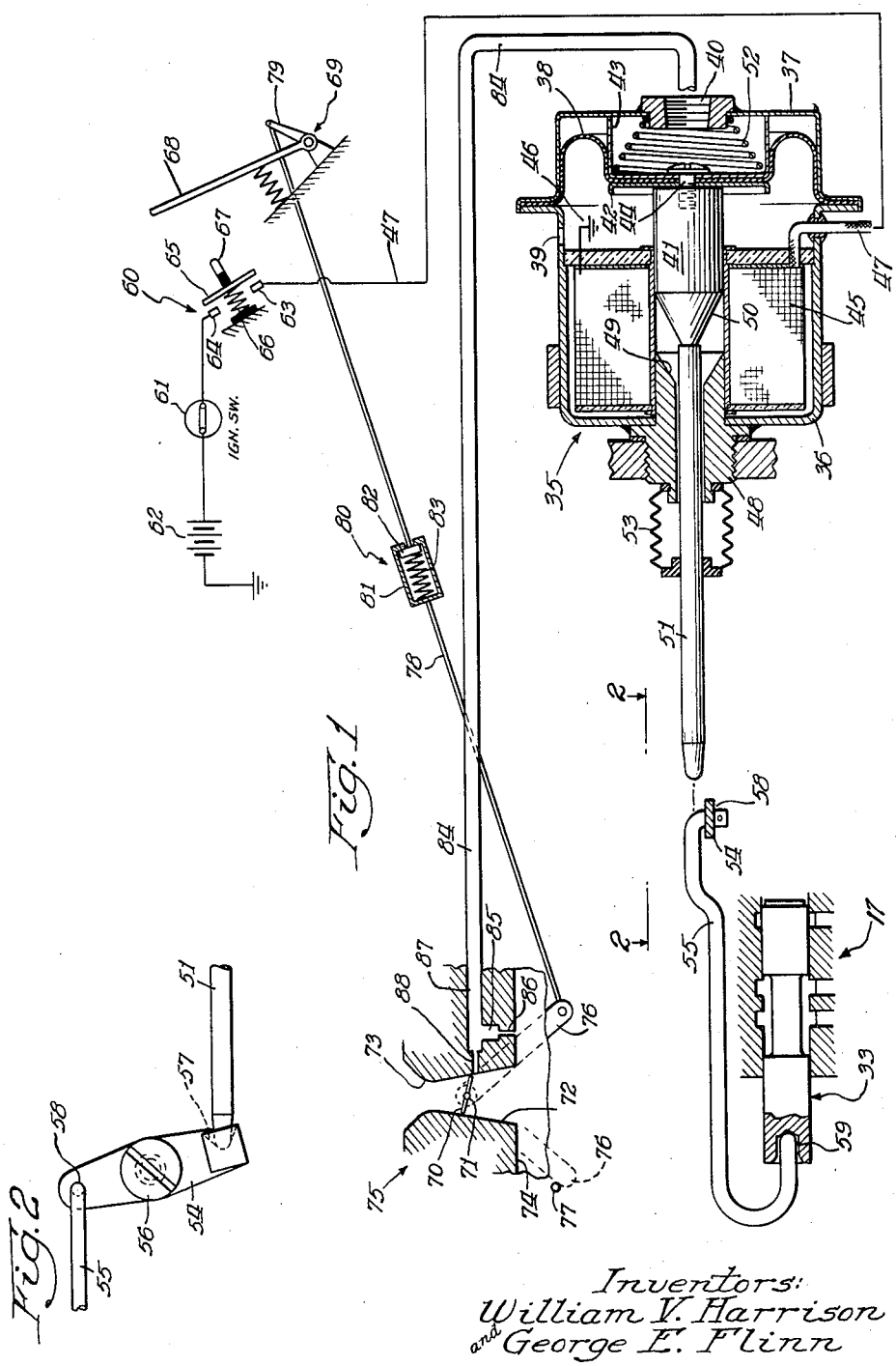
Inventors:
William V. Harrison
and George E. Flinn
By: Keith J. Blew
Atty.

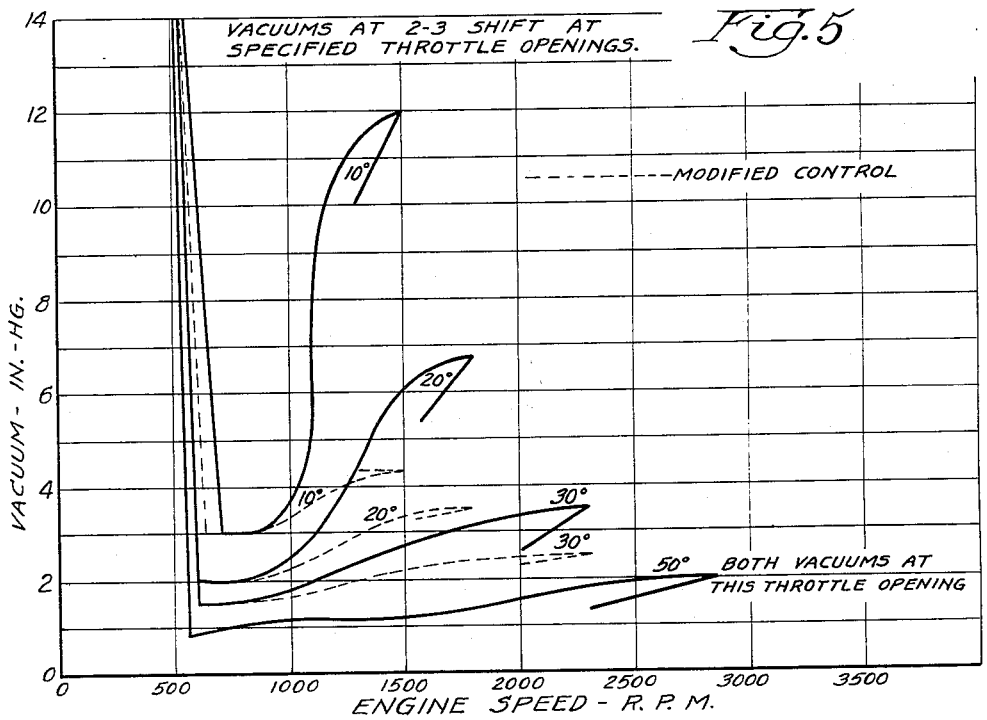
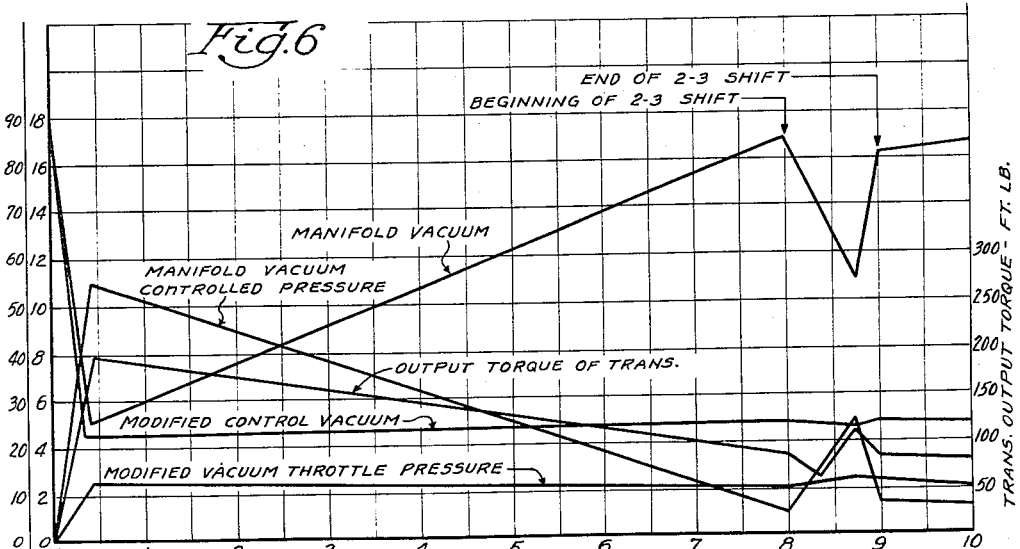

2,938,403

CONTROL FOR TRANSMISSION

William V. Harrison and George E. Flinn, Muncie, Ind., assignors to Borg-Warner Corporation, Chicago, Ill., a corporation of Illinois Filed Oct. 14, 1954, Ser. No. 462,300

4 Claims. (Cl. 74—472)

Our invention relates to hydaulic controls for automatic transmissions for engine driven vehicles.

Transmissions for automotive vehicles have in the past been automatically controlled by hydraulic mechanisms, and some of these mechanisms have included a throttle actuated valve for supplying a hydraulic throttle pressure that increases with throttle opening, the throttle actuated valve being controlled by the vehicle accelerator by means of a mechanical linkage connecting the throttle valve and accelerator. This hydraulic throttle pressure is used for determining the time of change in speed ratio with respect to vehicle speed and is also used for determining the pressure of engagement of power train completing friction clutches and brakes. The accelerator is, of course, mounted on the floor board of the driver's compartment while the throttle valve is included with the transmission mounted directly behind the engine of the vehicle. Due to this separation of the accelerator and the throttle valve and due to the fact that there is relative movement between the floor board and transmission, such mechanical linkages connecting the accelerator and the transmission have been difficult to design to give satisfactorily consistent operation, and such linkages, once when installed, have only with great difficulty been kept in adjustment.

It is an object of the invention to provide an improved mechanism for actuating the hydraulic throttle valve in accordance with changes in opening of the vehicle engine throttle which includes other than a mechanical linkage between the engine throttle and the throttle valve and which is, therefore, not subject to these disadvantages. More particularly, it is an object of the invention to provide a vacuum responsive motor connected with the carburetor and manifold of the vehicle engine for actuating the throttle valve in this manner. We have found that pure manifold pressure is not satisfactory for actuating the vacuum motor in order to give substantially the same response to the hydraulic throttle valve that is obtained by means of a direct mechanical connection with the accelerator, and it is, therefore, an object to provide an improved vacuum producing arrangement connected with the manifold and carburetor of the vehicle engine for providing this response. In this connection it is an object to provide a restricted orifice connected with the engine manifold and a restricted orifice disposed in the vehicle carburetor beneath the throttle plate or butterfly valve and connected with the other orifice for providing this response.

It is also an object of the invention to so arrange the vacuum orifices that a consistent cut-in point, that is, the point with respect to throttle opening a which the throttle valve begins to regulate output pressure, is obtained, and in this connection it is an object to locate the orifice adjacent the butterfly valve immediately beneath the throttle plate so that only a movement of a few degrees of the throttle plate is effective to uncover this orifice.

The transmission controls disclosed in this application constitute improvements on the hydraulic transmission controls disclosed in the application of Robert W. Wayman, Serial No. 166,136, filed June 5, 1950, and the application of Robert W. Wayman, Serial No. 249,296, filed October 2, 1951.

The invention consists of the novel constructions, arrangements and devices to be hereinafter described and claimed for carrying out the above-stated objects, and such other objects as will appear from the following description of a preferred embodiment of the invention, illustrated with reference to the accompanying drawings, in which:

Fig. 1 is a view, partly diagrammatic, of the vehicle engine carburetor and manifold, actuating a vacuum responsive motor which in turn actuates a throttle valve, Fig. 1 also showing an electrical control system for the vacuum motor;

Fig. 2 is a view taken from line 2—2 of Fig. 1 showing a part of the connection between the vacuum motor and the throttle valve;

Figure 4:
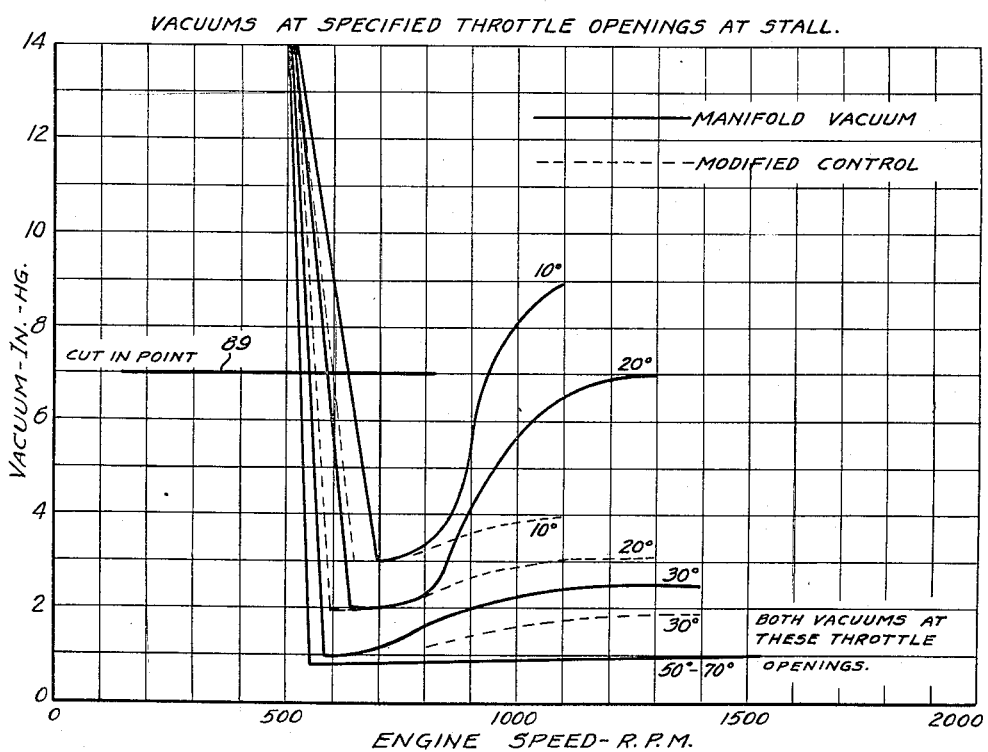
Fig. 4 is a graph showing the variations of vacuum pressure in the engine manifold and in a modified control vacuum which is the resultant of the vacuum pressures in the engine carburetor and in the engine manifold, these vacuum pressures being at stall conditions of the vehicle engine.
Figure 3:
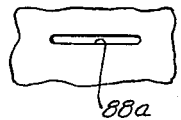
Fig. 3 is an elevational view of an orifice that may be used in lieu of an orifice illustrated in Fig. 1 in the engine carburetor.

Fig. 5 is a graph also showing the manifold vacuum and the modified control vacuum at specified throttle openings as the engine speed increases with a corresponding increase in speed of the vehicle until a change from an intermediate speed to a high speed takes place in the transmission; and Fig. 6 is a graph showing the manner of variation during a change of speed ratio, as mentioned with respect to Fig. 5 of the modified control vacuum, the manifold vacuum, the manifold vacuum controlled hydraulic pressure, the modified vacuum throttle pressure, and the output torque of the transmission.

Like characters of reference designate like parts in the several views.

A downshift valve 17 (Fig. 1) is controlled by means of a vacuum motor 35. The vacuum motor 35, as seen in Fig. 1, comprises a casing portion 36 and a second casing portion 37 fixed thereto. A diaphragm 38 of flexible material is clamped between the casing portions 36 and 37. The casing portion 36 is provided with a vent 39 to atmosphere on one side of the diaphragm 38, and the casing portion 37 is provided with a port 40 adapted to be connected to a source of vacuum.

The diaphragm 38 is fixed to an armature 41 at the center of the diaphragm. The diaphragm is mounted between a sheet metal disc 42 on one side of the diaphragm and a hollow sheet metal cup 43 on the other side of the diaphragm, and a screw 44 extends into the armature 41 and through the cup 43, disc 42 and diaphragm 38 for clamping the diaphragm between the disc 42 and cup 43 and fixing it with respect to the armature 41.

An electric winding 45 is disposed in the casing portion 37, and the armature 41 is adapted to move into the winding 45. The winding 45 is grounded at one end 46 and at its other end it is connected to an electric lead 47.

A sleeve 48 having a tapered end surface 49 extends through the casing portion 36 and partially into the winding 45. The armature 41 has a tapered end 50 adapted to come into contact with the tapered surface 49 on the sleeve 48 when the armature 41 moves into the winding 45. The armature 41 acts on a thrust rod 51 extending through the sleeve 48, and a spring 52 is disposed within the cup 43 and within the casing portion 37 to urge the armature 41 into abutting contact with the thrust rod 51. A dust proofing boot 53 of rubber like material is disposed about the sleeve 48 and thrust rod 51.

The thrust rod 51 is coupled with the downshift valve piston 33 by means of a lever 54 and a thrust rod 55. The lever 54 is pivoted on a stationary stud 56, and the thrust rod 51 extends into a slot 57 provided in one end of the lever 54. The thrust rod 55 extends through an opening 58 provided in the other end of the lever 54 and extends into a slot 59 provided in the outer end of the downshift valve piston 33.

The lead 47 is connected to a kickdown switch 60 which is also connected with the usual ignition switch 61 of the vehicle. The ignition switch 61 has the conventional connection with the vehicle battery 62 which has one of its terminals grounded. The kickdown switch 60 has two contacts 63 and 64 adapted to be bridged by means of a switch blade 65. The blade is acted on by a spring 66 and is held thereby out of bridging relationship with respect to the contacts 63 and 64 and is provided with a stud 67 adapted to be acted on by the conventional vehicle accelerator 68. The accelerator 68 has a conventional pivotal connection 69 with a stationary part of the vehicle for allowing depression of the accelerator by the foot of the operator in accordance with the usual custom.

The accelerator 68 has an ordinary connection with the throttle plate or butterfly valve 70 of the vehicle engine. The throttle plate 70 is pivotally mounted on a shaft 71 in the relatively large diameter carburetor passage 72 located between the relatively restricted carburetor throat 73 and the usual fuel intake manifold 74 connected to the cylinders of the internal combustion vehicle engine 75. The throttle plate 70 is fixed on the shaft 71, and a throttle lever 76 is also fixed on the shaft 71 exteriorly of the carburetor for opening the throttle plate 70. A stop pin 77 is provided cooperating with the lever 76, for limiting the throttle opening movement of the throttle plate 70 to a wide open throttle position shown in dotted lines, through an angle of movement of substantially 80° in the particular embodiment illustrated.

A link 78 is connected between the throttle lever 76 and a lever 79 which is fixed with respect to the accelerator pedal 68 to swing therewith about the pivotal mounting 69 of the pedal 68. A lost motion connection 80 of any suitable type is provided in the link 78. The lost motion connection 80, as illustrated, comprises a shell 81, a disc 82 slidably disposed in the shell 81, and a compression spring 83 disposed between the disc 82 and the closed end of the shell 81. The arrangement is such that the throttle 70 is moved from its illustrated throttle closing, engine idling, position to its fully opened throttle position in which the throttle lever 76 contacts the stop pin 77 by a depression of the accelerator 68 due to force transmitted through the lever 79, the lost motion connection 80 and the link 78 to the throttle lever 76. Such movement of the throttle plate 70 is without yielding of the spring 83 and the lost motion connection 80 and before contact of the accelerator 68 with the switch stud 67. When the accelerator is moved still farther out of and beyond its fully open throttle position, such movement is by virtue of a yielding by the spring 83 and the lost motion connection 80 without any additional movement of the throttle lever 76 and throttle plate 70, and the accelerator 68 in such movement contacts the switch stud 67 and moves the switch blade 65 into contact with the switch contacts 63 and 64.

The port 40 of the motor 35 is connected by means of a vacuum conduit 84 with both the manifold 74 and also with the carburetor passage 72. The conduit 84 is connected with a branch passage 85 which is connected with the manifold 74 through a restricted opening 86. The conduit 84 is also connected with a branch passage 87 which is connected with the carburetor passage 72 by means of a restricted opening 88. It will be noted that the restricted opening 88 is disposed immediately beneath one edge of the throttle plate 70 when the plate is in its throttle closing engine idling position in which it is shown in full lines. The connection of the vacuum motor 35 with both the manifold 74 and also with the throttle opening 72 provides a vacuum pressure in the conduit 84 that varies much more closely with torque demand by the vehicle operator as evidenced by depression of the vehicle accelerator 68 than the pressure that exists in the manifold 74 alone, as will be more fully described hereinafter. The restricted opening 88 is preferably smaller than the restricted opening 86, and in an actual embodiment of our invention, satisfactory operation was obtained with the restricted opening 88 being .028 inch in diameter and the restricted opening 86 being .032 inch in diameter. It will be understood, of course, that these dimensions are given only for the purpose of illustration, and we do not intend that our invention shall be limited to any particular dimensions.

In operation, the transmission and its hydraulic control system are under the control of the vehicle operator by means of the accelerator 68 and a manual selector valve. The transmission is conditioned for various types of operation by moving the manual selector valve into positions corresponding to the type of operation desired.

Figure 4 is illustrated to show the manner in which the modified vacuum in passage 84 varies with respect to the manifold vacuum in the manifold 74 for a particular engine and actual embodiment of the invention, both the modified vacuum pressure in the passage 84 and the vacuum pressure in the manifold 74 being plotted in accordance with changes in engine speed. This figure shows the vacuum pressures that exist at stall, namely, with the transmission driven shaft held stationary and increasing engine speeds being allowed due to the slip in the hydraulic torque converter. In this figure, the values of vacuum in the manifold 74 are shown in full lines, and the modified vacuum pressures in passage 84 are shown in dotted lines for various openings of the throttle plate 70, which opens between 0° and 80°. As will be observed from Fig. 4, the modified control vacuum drops from a high value to a relatively low valve, as the engine speed increases above idling speed, the throttle plate being moved to its 10° opening, for example. With further increases of engine speed, the modified vacuum pressure increases only slightly. It will be noted that the manifold vacuum increases with engine speed most greatly for relatively small throttle openings; and at substantially full open throttle positions, the manifold vacuum and modified control vacuum pressures are substantially the same. It will be observed that the modified control vacuum varies with degrees of throttle opening almost proportionately until approximately 50° throttle opening is reached, after which it remains about the same. Ordinary internal combustion engines do not give appreciably greater power output after the 50° opening of the throttle plate is exceeded, and hence it is not necessary to have the vacuum pressure vary substantially above this degree of throttle opening.

Fig. 5 illustrates the same results as Fig. 4, but in the case of Fig. 5, the transmission driven shaft is released to drive the vehicle in second speed ratio drive. As is apparent from Fig. 5, also, the modified control vacuum pressure increases with engine speed to a much less extent than does the manifold vacuum, which characteristic renders the pure manifold vacuum unsatisfactory for use for regulating the throttle pressure in passage 32. It will be noted from Fig. 5 that under these conditions, the engine speed and the modified control vacuum pressure decrease once a maximum valve has been reached, for example, at 1800 revolutions per minute engine speed for 20° opening of the throttle plate 70. This is due to the fact that at this particular point an upshift from second speed ratio to third speed ratio due to action of a 2–3 valve takes place thereby reducing engine speed and thereby changing the modified control vacuum pressure. As will be described, the throttle pressure in conduit 32 is effective on the 2-3 valve that causes the changes between second and third speed ratios, and it is thus necessary that throttle pressure in conduit 32 remain approximately the same when a change from second to third speed ratio is made in order that a hunting condition of the 2-3 valve does not occur. This requirement is met with the modified control vacuum pressures shown in dotted lines in Fig. 5 but not with the manifold vacuum pressures shown in full lines, particularly at small openings of the throttle valve plate 70.

Fig. 6 is included herein to further illustrate the effectiveness of the modified vacuum in passage 84 for controlling the throttle pressure in passage 32. This figure shows, in connection with the specific embodiment of the invention hereinbefore referred to, the manner in which the modified control vacuum in passage 84 varies during the time of shift between second speed ratio and third speed ratio under the control of the 2-3 valve, and the corresponding variations of the modified vacuum throttle pressure in passage 32 and the output torque of the transmsision are also shown. For purposes of comparison, the corresponding manifold vacuum in the manifold 74 is shown together with the manifold vacuum controlled pressure which would exist in passage 32, if the manifold pressure were applied directly to the vacuum motor 35 in lieu of the modified control vacuum pressures. The transmission output torque is also shown.

It is assumed for Fig. 6 that the vehicle is started from rest in second speed ratio with the throttle plate 70 being moved from 0° to 5° open position, so that the vehicle speed increases to cause a shift from second to high speed ratio between 8 and 9 seconds after the vehicle has started. This shift is caused by the governor valve cooperating with the 2-3 valve. As will be observed, the modified control vacuum varies only slightly between the eighth and ninth seconds during which the second to third shift is actually being made. Accordingly, the modified vacuum throttle pressure varies also only slightly, which is desirable in order that a hunting condition of the 2-3 valve is not obtained, since the throttle pressure is impressed on the 2-3 valve. These desirable conditions, however, do not exist for the manifold vacuum and the throttle pressure that would exist controlled solely by the manifold vacuum. As will be observed, the manifold vacuum varies considerably between the eighth and ninth seconds, and this is also true of the manifold vacuum controlled pressure that would exist if the pressure were controlled only by the manifold vacuum. This great variation in manifold vacuum and a fluid pressure controlled thereby is due to the rapid change in engine speed when a shift is made between second and third speed ratios.

Our improved control for the throttle valve gives substantially the same results as if the throttle valve were directly controlled by the accelerator 68 by means of a mechanical linkage, that is, whenever the accelerator is depressed toward toward open throttle position, the throttle valve is actuated so as to provide an increasing hydraulic throttle pressure. Since the throttle valve is actuated by means of the vacuum motor 35 with our improved arrangement, no such mechanical linkage is needed. Such linkage notoriously easily gets out of adjustment and is quite difficult to adjust initially particularly since there is generally relative movement between the floorboard in the passenger compartment on which the accelerator is mounted and the transmission carrying the throttle valve. In this connection, it may be noted that the vacuum motor 35 mechanically connected with the valve through the downshift piston 33 is preferably mounted on the transmission adjacent the downshift valve piston 33.

Since our improved vacuum arrangement includes the orifice 88 located immediately beneath the throttle plate 70, the cut-in point, or the point at which the throttle valve begins to regulate pressure, may be quite closely set with respect to throttle opening. With mechanical linkage between the accelerator 68 and the downshift valve piston 33 as in prior arrangements, such linkage was quite difficult to adjust in order to consistently provide the proper cut-in point for the valve. As has been illustrated above, pure manifold vacuum is not satisfactory for use in connection with the vacuum motor 35; however, due to the use of the orifice 88 connected with the orifice 86, a modified vacuum is obtained which advantageously varies quite closely with throttle opening.

We wish it to be understood that our invention is not to be limited to the specific constructions and arrangements shown and described, except only insofar as the appended claims may be so limited, as it will be apparent to those skilled in the art that changes may be made without departing from the principles of the invention.

We claim:

1. In combination, an internal combustion engine having a fuel intake manifold and a fuel carburetor with a rotatable butterfly valve plate therein, a control element, a vacuum responsive device for applying a force on said control element, said carburetor having an orifice therein as a point adjacent the butterfly valve plate so that the vacuum at this point is changed with opening of the butterfly valve plate, said manifold also having an orifice therein, and conduit means connecting both of said orifices to said vacuum responsive device so that the force controlling effect of the vacuum responsive device is the resultant of the combined pressures from both said manifold and said carburetor.

2. In combination, an internal combustion engine having a fuel intake manifold and a fuel carburetor with a rotatable butterfly valve plate therein, a control element, a vacuum responsive device including a diaphragm for applying a force on said control element, said carburetor having an orifice therein adjacent and below an edge of the butterfly valve plate which orifice is opened by the valve plate to the air intake side of the carburetor when the valve plate is moved in a carburetor opening direction from an engine idling position, said manifold also having an orifice therein, and conduit means connecting both of said orifices to said diaphragm so that the force controlling effect of said vacuum responsive device is the resultant of the combined pressures from both said manifold and said carburetor.

3. In combination, an internal combustion engine having a fuel intake manifold and a fuel carburetor with a rotatable butterfly valve plate therein, a regulating valve for supplying fluid under pressures that changes with changes in force applied to the regulating valve, a vacuum responsive device for applying the force on said regulating valve, said carburetor having an orifice therein adjacent and below an edge of the butterfly valve plate which orifice is opened by the valve plate to the air intake side of the carburetor when the valve plate is moved in a carburetor opening direction from an engine idling position, said manifold also having an orifice therein, a conduit means connecting both of said orifices to said vacuum responsive device so that the force controlling effect of the vacuum responsive device is the resultant of the combined pressures from both said manifold and said carburetor.

4. In combination, an internal combustion engine having a fuel intake manifold and a fuel carburetor with a rotatable butterfly valve plate therein, an accelerator for controlling the valve plate, a control element, a vacuum responsive device for applying a force on said control element tending to move the control element from a first toward a second position as the vacuum changes, said carburetor having an orifice therein at a point adjacent the butterfly valve plate so that the vacuum at this point is changed with opening of the butterfly valve plate, said manifold also having an orifice therein, conduit means connecting both of said orifices to said vacuum responsive device so that the force controlling effect of the vacuum responsive device is the resultant of the combined prespressures from both said manifold and said carburetor, and selectively operable means under the control of said accelerator for moving said control element to its second position when said accelerator is moved to an open throttle position.

References Cited in the file of this patent

UNITED STATES PATENTS

| | | |
|---|---|---|
| 2,175,235 | Whittington | Oct. 10, 1939 |
| 2,667,085 | Ackerman | Jan. 26, 1954 |
| 2,752,933 | Olson | July 3, 1956 |
| 2,770,148 | Wayman | Nov. 13, 1956 |